(12) United States Patent
Talja

(10) Patent No.: US 8,042,106 B2
(45) Date of Patent: Oct. 18, 2011

(54) DATA PROCESSING IN A MEDIATION OR SERVICE PROVISIONING SYSTEM

(75) Inventor: Ari Talja, Espoo (FI)

(73) Assignee: Comptel Corporation, Helsinki (FI)

( * ) Notice: Subject to any disclaimer, the term of this patent is extended or adjusted under 35 U.S.C. 154(b) by 1259 days.

(21) Appl. No.: 11/571,700

(22) PCT Filed: Jun. 16, 2005

(86) PCT No.: PCT/FI2005/000287
§ 371 (c)(1),
(2), (4) Date: Jan. 5, 2007

(87) PCT Pub. No.: WO2006/003239
PCT Pub. Date: Jan. 12, 2006

(65) Prior Publication Data
US 2008/0263075 A1    Oct. 23, 2008

Related U.S. Application Data

(60) Provisional application No. 60/585,527, filed on Jul. 6, 2004.

(30) Foreign Application Priority Data

Jul. 6, 2004    (EP) .................................... 04396044

(51) Int. Cl.
*G06F 9/44* (2006.01)
(52) U.S. Cl. ........ 717/171; 717/176; 717/120; 717/151; 717/162

(58) Field of Classification Search .................. 717/171, 717/176
See application file for complete search history.

(56) References Cited

U.S. PATENT DOCUMENTS 5,548,749 A * 8/1996 Kroenke et al. ..................... 1/1
5,560,005 A * 9/1996 Hoover et al. ........................ 1/1
(Continued)

OTHER PUBLICATIONS

Click, Cliff et al. "A Simple Graph-Based Intermediate Represenation", ACM Sigplan Notices, Mar. 1995, No. 3, New York, NY.

(Continued)

*Primary Examiner* — Thomas K Pham
(74) *Attorney, Agent, or Firm* — Baker & Daniels LLP

(57) ABSTRACT

Embodiments of the invention include a data processing system and method for processing data in a mediation or service provisioning system of a communications network. In the invention, a special logic definition structure is formed based on the processing logic. The logic definition structure is designed so that it is easy to modify and efficient to execute. This is made possible by defining the processing logic in the form of a series of byte code instructions, wherein each instruction contains a pointer to a piece of program code performing a function and a pointer to parameters to be used in performing the function. The instructions, the program codes performing the functions, the pointers and the data under processing are preferably stored in arrays thus allowing the use of efficient pointer mechanisms together with flexibility and ease of modification.

48 Claims, 5 Drawing Sheets

U.S. PATENT DOCUMENTS

| | | | |
|---|---|---|---|
| 5,737,737 A * | 4/1998 | Hikida et al. | 1/1 |
| 6,094,654 A * | 7/2000 | Van Huben et al. | 1/1 |
| 6,366,657 B1 | 4/2002 | Yagel et al. | |
| 6,449,618 B1 | 9/2002 | Blott et al. | |
| 6,591,416 B1 | 7/2003 | Bak et al. | |
| 7,039,919 B1 * | 5/2006 | Hunt | 719/316 |
| 7,634,778 B2 * | 12/2009 | Mosier et al. | 719/318 |
| 2004/0015514 A1 * | 1/2004 | Melton et al. | 707/103 R |
| 2004/0226025 A1 * | 11/2004 | Beaudoin et al. | 719/321 |
| 2004/0268309 A1 * | 12/2004 | Grover et al. | 717/120 |

OTHER PUBLICATIONS

Bedicheck, Robert C., "Talisman, Fast and Accurate Multicomputer Simulation", Laboratory for Computer Science, Massachusetts Institute of Technology, Cambridge, MA, Published May 1, 1995.

Chandra, Subhash et al., "Retargetable Functional Simulator Using High Level Processor Models", Department of Computer Science & Engineering, Indian Institute of Technology, Kanpur, India, 13th International Conference on VLSI Design, Jan. 2000.

Bell, James R., "Threaded Code", Communications of the ACM, Jun. 1973, vol. 16, No. 6.

* cited by examiner

DATA PROCESSING IN A MEDIATION OR SERVICE PROVISIONING SYSTEM

TECHNICAL FIELD

The present invention relates to data processing.

In particular, the present invention relates to processing structured data records, containing data fields and data in the data fields. One example of such a data record is an event record containing data on usage of a communications network.

Hence, an embodiment of the present invention relates to mediation methods and systems. Mediation is a process wherein usage data is collected from a communication network and delivered to operator's Operation and Business Support System(s) (OSS/BSS). Mediation software collects usage data from the network by interfacing various different network elements. The mediation layer then aggregates, correlates, enriches, validates, formats, and/or rates the data so that it is readable by the target OSS/BSS system(s) and it contains all the required information.

In modern telecommunications networks, there is a demand for handling events as soon as the data is available in the network. Continuous streaming mediation, which is also called real-time mediation, has been developed to fulfill these requirements. Especially in continuous streaming mediation, quality, reliability and effectiveness of data processing are very important.

In modern telecommunications networks, there is also a need for easy adaptation of the system to provide new services and process the event records according to varied processing requirements. The above-mentioned objectives are often in contrast to each other: easy adaptation of the system tends to reduce the throughput whereas a system having an optimized throughput usually required intensive work to reconfigure.

Another embodiment of the present invention relates to provisioning systems and methods. Service provisioning and service activation is a process wherein any types of services in all types of networks are provisioned and activated to network elements. These can be for instance activating all consumer and corporate services, such as voice, ADSL, WLAN access and VPN with the same provisioning system to help the operator to remove lots of costly, unnecessary and overlapping processes.

BACKGROUND ART

U.S. Pat. No. 6,449,618 discloses one real-time event processing system. The system presented in the publication has poor flexibility.

U.S. Pat. No. 6,366,657 discloses a system of supporting and managing telecommunications services. The principle idea of U.S. Pat. No. 6,366,657 is that the system comprises a Service Creation Environment (SCE). The SCE simplifies creation, provision, and management of new services for subscribers. This is done by toolkits for specifying object definitions in an object-oriented framework. The system presented in the publication is directed to telecommunication operators to simplify provision of services.

There are two alternative ways to develop the known systems further in attempt to combine effectiveness and easy modification and management.

The first alternative would be to generate some scripting language from the predefined processing logic. One suitable scripting language is Perl. An advantage of this approach is that the resulting code can be viewed and is human readable. Hence, the code is easy to debug. However, there are several disadvantages in the scripting language approach. For example, the performance is relatively poor as the scripting languages (even Perl) are slower than native code. It is also difficult to generate valid code and to ensure that the variable names etc. do not cause any conflicts in the system.

The second alternative would be to generate C or Java source code and compile it before the execution. This solution produces the fastest code, if C is used, because no interpreting is needed. However, with this solution, it is challenging to compile the source code and ensure that the system really works correctly. If rapid changes to the logic are needed, the processing logic created in this way could not be tested before use. This makes the system unreliable and risky. Compilation is also very difficult if not impossible because it has to be performed in a customer environment and on different platforms. Hence, this approach involves serious risks and is extremely difficult. However, if the problems involved in this solution could be solved, the solution would offer a very high performance.

DISCLOSURE OF INVENTION

It is an object of the present invention to create a reliable data processing system and method that both provide a relatively high performance and are relatively easy to adapt to new processing logics.

The object of the invention is achieved by forming a special logic definition structure based on the processing logic. The logic definition structure is designed so that it is easy to execute efficiently. The logic definition structure is also designed such that making modifications to the processing logic requires relatively limited and straightforward alterations in the logic definition structure. This is made possible by defining the processing logic in the form of a series of byte code instructions, wherein each instruction contains a pointer to a piece of program code performing a function and a pointer to parameters to be used in performing the function. The instructions, the program codes performing the functions, the pointers and the data under processing are preferably stored in arrays thus allowing the use of efficient pointer mechanisms together with flexibility and ease of modification.

In an embodiment, the logic definition structure comprises a parameter array containing pointers to the values of the parameters needed in the processing logic. The logic definition structure also includes a function code set containing program codes for performing the functions needed in the processing logic and a series of byte code instructions. Each of the instructions points to pointers in the parameter array and a function code that are needed in the execution of the instruction.

The present invention makes it possible to construct a reliable data processing system and method that both provide a relatively high performance and are relatively easy to adapt to new processing logics.

The inventive concept allows also several useful and advantageous embodiments, which provide further advantages.

In an embodiment of the invention adaptation of provisioning logic can be implemented and visualised through a graphical user interface. New services and service packages—regardless of their complexity—can be rapidly introduced without having to make timely and costly changes to OSS/BSS system of an operator.

The invention also offers embodiments of a mediation system, which can be operated continuously once started, because all of the configurations can be made while the system is in production.

There are also embodiments, which allow both batch-type processing and real-time processing of event records.

As is apparent from the above disclosure, the present invention can be applied in a great variety of applications requiring fast and reliable processing of event records.

BRIEF DESCRIPTION OF DRAWINGS

For a more complete understanding of the present invention and the advantages thereof, the invention is now described with the aid of the examples and with reference to the following drawings, in which.

DEFINITIONS

Figure 1:
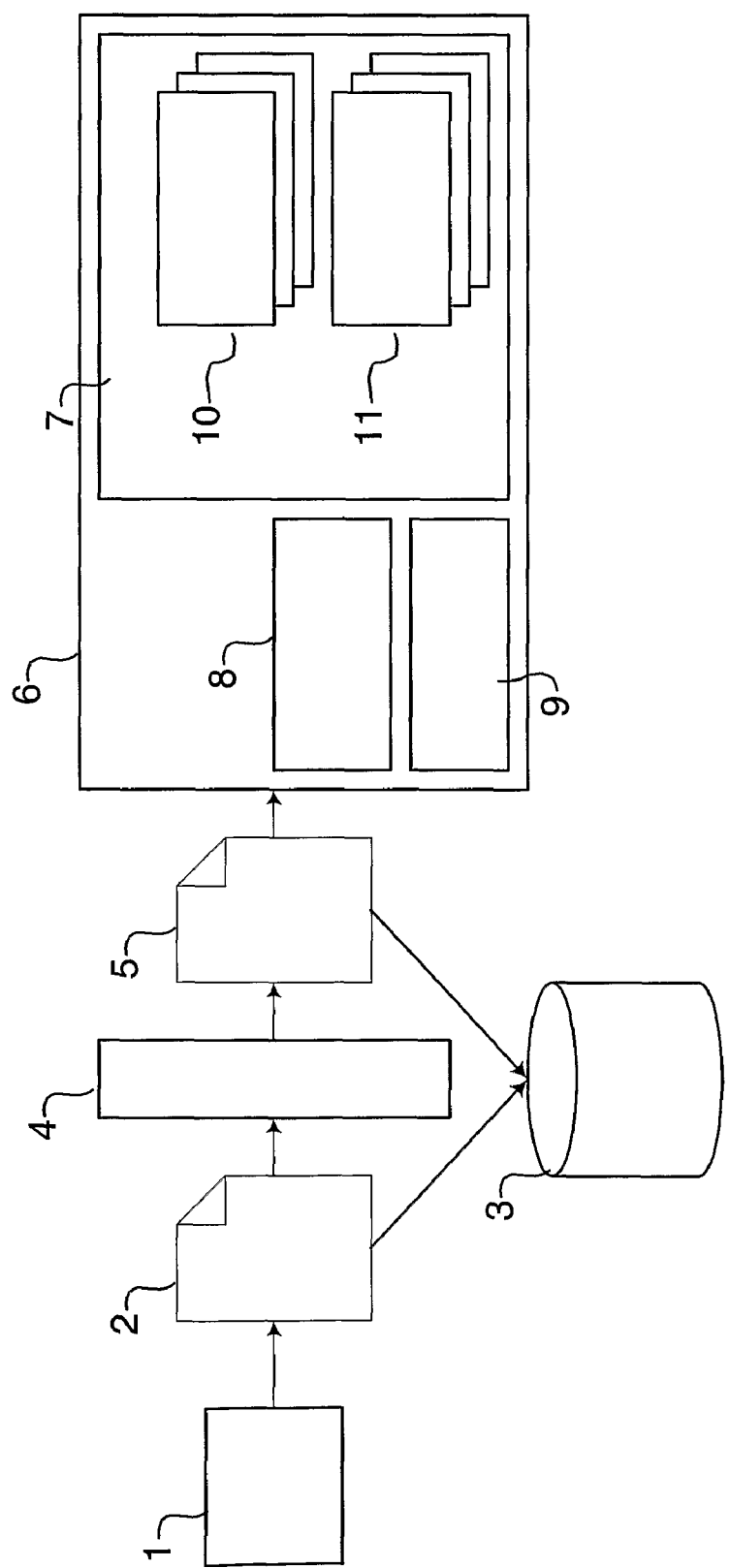
FIG. 1 presents a block diagram of a system according to an embodiment of the invention.

Data Record: A data record is a record containing data on e.g. a service usage or provisioning request. Data Record typically contains several data fields and may be structured (records contain other records). In communication systems examples of data records include CDR, Call Detail Record; ER, Event Record; UDR, Usage Data Record; and IPDR, Internet Protocol Detail Record.

Field: Field is a single unit of a data record. Normally field contains a value that can be any data (date, integer, string, etc).

Event: Event is a transaction occurring in a telecommunications network. Events are typically caused by actions taken by a subscriber while using telecommunication services. Events may also be based on actions taken by the telecommunication network or an apparatus connected to it, e.g. while executing telecommunications services. Some events may be even generated automatically while executing service programs and performing other functions for providing services to the customers.

Event Record: Event Record is a data record that indicates that an event has occurred. That is, an even record provides information that a subscriber has used a telecommunications service. Event record contains also detailed information about the event. Hence, an event record may contain information on the usage, e.g. if the used telecommunication service is a phone call, the event record may indicate how long the call lasted, or if the service is downloading a file from an FTP server, the event record may contain information about the size of the transferred data block.

Real time: In contrast to batch processing, real time processing refers to passing event record through mediation system in streaming format. That is, as soon as a certain node in mediation stream has processed (e.g. enriched) the record, it is passed to the next node. In batch processing, a great number of event records are first collected in an intermediate storage and then the lot of event records is processed from the intermediate storage. Hence, in batch processing, processing delays experienced by the event records are typically long and vary between the event records. In real time processing, processing delays experienced by the event records are typically short and substantially the same in magnitude between the event records.

Pass-through time in a real-time system may be, e.g. from about 1 millisecond to 10 seconds. In some embodiments, events may pass through the system even faster. Sometimes, depending on the embodiment and application, the term real-time may also comprise pass-through times longer that stated above. In general, a real-time service is a service that does not include considerable delays such that a user of the service considers acts being taken and services provided essentially at the moment the services are ordered (i.e. events supplied to the mediation system).

Input record: An input record is a data record that is read by a processing node. The format and structure of the input record are preferably predefined and known by the node.

Output record: An output record is a data record that is written by a processing node. The format and structure of the output record are predefined and known by the processing node.

Processing Logic Executor: Processing Logic Executor is a node application in a mediation system. Processing Logic Executor manages predefined processing logic in a processing stream. It executes the user defined rule-set using existing prototype functions for rules.

Node Base: Node Base provides an interface for reading input records and writing output records. Processing Logic Executor gets field values using the name of the field from Node Base. Node Base implements the functionality for operations like creating a new output record and rejecting existing record.

Function: (=Arrows in FIG. 2)

Arrow or actually a group of arrows pointing to a single field represent a function. Function is a prototype of one processing rule, e.g. field validation, value matching or conversion.

Function code: Function code is a program code for performing a function needed in the predefined logic. In a preferred embodiment, function code is a binary code directly executable by an operating system. Code uses function parameters for decisions that need to be made during function execution.

Instruction: Instruction is a single unit of Processing Logic Byte Code. In a preferred embodiment, an instruction contains a pointer to the function code, pointer to the function parameters and the number of parameters. Instructions are created during the compilation process.

Byte Code Executor: Byte Code Executor is the component that takes care of instruction fetching, decoding and execution. Thus, the Byte Code Executor takes the next instruction from array and calls the function of the instruction using the parameters of the instruction.

Shared library files: Shared library files contain function code for both core and custom functions. The code is produced by C compiler and is fast to execute. Functions are loaded into memory from the files when the Processing Logic Executor node is started.

BEST MODE FOR CARRYING OUT THE INVENTION

FIG. 1 shows one example of using an embodiment of the invention. The system of FIG. 1 comprises a graphical user interface 1 (GUI) for defining the predefined processing logic according to which the user desires the system to process data records, such as event records of a communications network. GUI 1 produces a Predefined processing logic file 2 containing the Predefined processing logic, and takes care of saving the data into a persistent storage, e.g. database 3. In the embodiment, Predefined processing logic file 2 contains an XML representation of the logic built with the GUI 1.

The system comprises a Compiler 4 that uses the Predefined processing logic file 2 as a source code and builds a Processing Logic byte code 5 on the basis of the Predefined processing logic. The compilation is performed every time the logic is tested or saved into the persistent storage 3. The persistent storage 3 holds all Processing Logic configurations and the compiled byte codes for them.

Processing Logic byte code 5 is a plain text file that describes how the predefined processing logic should be executed. It has a sequential set of instructions and their parameters. All instructions are saved using the original function names.

The system also comprises a Processing Logic Executor 6, which may be a node application that can be executed using Node Base. Processing Logic Executor 6 itself comprises a function library 7, byte code parser 8 and a Byte Code Executor 9.

Function library 7 holds all functions of the Processing Logic. In the figure, the function library 7 is divided into core functions 10 and custom functions 11.

Byte code parser 8 parses the plain text byte code 5 and produces a more efficient form of the code. The complete byte code does not have any function names but direct pointers to them.

Byte Code Executor 9 executes the parsed byte code. Hence, the Byte Code Executor 9 acts as the logic execution means for executing the predefined processing logic. The code is executed "blindly" without knowing what the functions do.

Hence, in the embodiment, the graphical user interface 1 can be used to set up the system to process data records according to a desired processing logic 2. After defining the processing logic, Compiler 4 analyses the processing logic 2 and compiles it into a format (Processing Logic byte code 5) that is fast and easy to execute. Compilation means reading the processing logic XML file, creating a data structure of it and producing byte code file using the data structure. Compiler 4 removes all "useless" information that is not needed in execution from the processing logic and flattens the structure of the logic. Compiler 4 also reserves a field array to which all the fields are placed. After this, fields are no longer referenced by their names but the index of the array. Byte code parser 8 changes the index to direct memory location.

Required instructions are added into the byte code when compiler 4 either encounters a function in processing logic definition or needs to add a function for e.g. jumping from one place to another in the code. When the compiler 4 adds an instruction, it also adds the parameters of the function as a list of indexes of the fields. Byte code parser 8 builds the parameter array using this information. After the compilation is ready, the compiler 4 calculates the values for byte code header fields.

In an advanced embodiment, a user can also define and add custom functions via the graphical user interface 1. When adding a custom function, the system adds a new plug-in screen for defining the function parameters in the graphical user interface 1. The system also adds a corresponding function code in the function code array of the Processing Logic Executor 6. For the custom function functionality, the compiler 4 includes a custom function extension for modifying the logic definition structure 2 to include the custom function and parameters of the custom function in the field arrays of the system.

Figure 2:
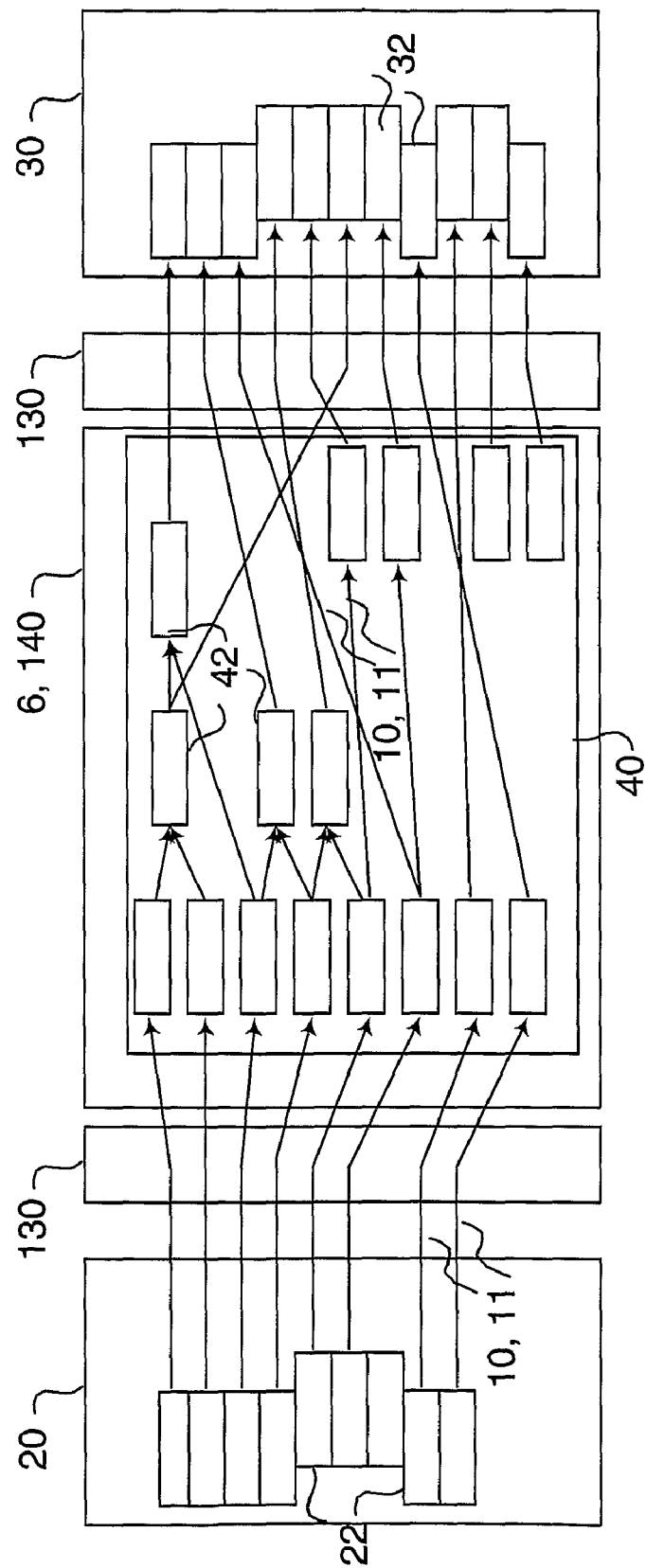
FIG. 2 presents a block diagram of an example of functioning according to an embodiment of the invention.

FIG. 2 shows one example of the functioning of the Processing Logic Executor 6. In FIG. 2, each arrow 10, 11 (or a group of arrows pointing to the same field) represent a Processing Logic function. The Processing Logic Executor 6 executes, in specified order, the Byte Code the Compiler 4 has generated. Each arrow in the figure represents a Processing Logic function that executes the action depending on function parameters (fields).

In the embodiment, fields 22, 32 in input 20 and output 30 records are the fields read by the node base 130. The node base 130 reads the fields 22 from an input file 20 and creates a data structure 40 for the record. Each field can be fetched or written using the field name. The Processing Logic Executor 6 does not have to read all fields from the input record.

In the embodiment, internal fields 42 in the Processing Logic Executor 6 are temporary fields that the Processing Logic Executor 6 has produced. Internal fields 42 may hold the original data read from the node base 130 or data generated by the functions 10, 11. Internal fields 42 can also be constants inside the Processing Logic Executor 6.

In the embodiment, Processing Logic Executor 6 allocates memory for all temporary fields 42 in initialisation phase to make the execution more efficient. Fields are grown automatically during the execution if needed. The fields read from node base do not need any space (node base takes care of that) and they cannot be modified inside Processing Logic Executor 6.

In the embodiment, the fields can be mapped directly from the input record 20 into the output record 30 without modifying the field or using it for any other fields.

In the figure, each arrow 10, 11 (or a group of arrows pointing to same field) represent a function in Processing Logic Executor 6. Function may be e.g. string concatenation, which takes two input fields and produces an output field. Processing Logic byte code 5 includes of pointers to these functions 10, 11 and their parameters.

Figures 3A, 3B:
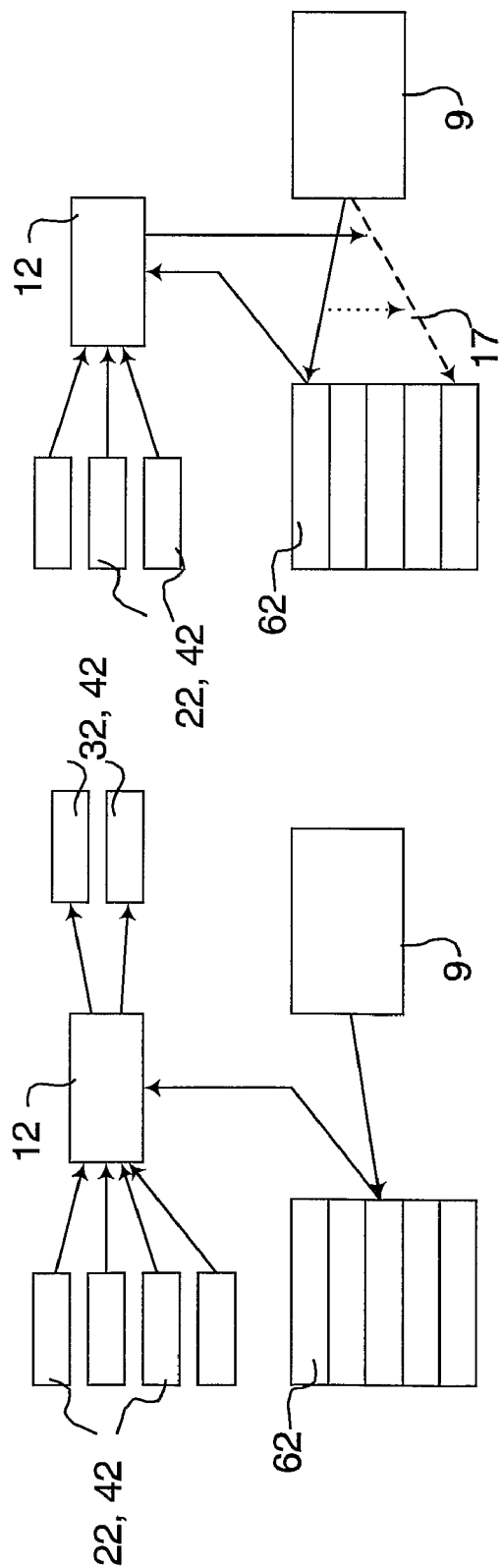
FIG. 3a presents a block diagram of an example of processing logic function execution according to an embodiment of the invention.
FIG. 3b presents a block diagram of another example of processing logic function execution according to an embodiment of the invention.

FIG. 3 shows two examples of Processing Logic function executions in an embodiment of the invention. In the embodiment on left (FIG. 3a) is an example of basic function that takes four input fields 22, 42 and produces two output fields 32, 42. In the embodiment of FIG. 3b, a function takes three input fields 22, 42 and doesn't produce any output fields but modifies a program counter 17 according to the field values.

In the embodiment, instructions 62 in FIGS. 3a and 3b are pointers to function codes 12. Function code 12 exists in memory only once even if there are many instructions 62 using it. Byte Code Executor 9 always executes the instruction 62 to which its program counter 17 points. Byte Code Executor 9 increases the program counter 17 by one after each function call.

FIG. 3b shows how a function can update the program counter. For example comparison functions, unconditional jump etc. modify the program counter. This means that the execution "jumps" to different place in code.

In the embodiment, Processing Logic Executor 6 gets its entire configuration in node application parameters and in byte code file 5. Node application parameters include all predefined processing logic specific parameters and the settings of Processing Logic Executor 6. Break points in the byte code and other debugging parameters are set using node parameters if needed. These parameters are used e.g. in debug mode.

Figure 4:
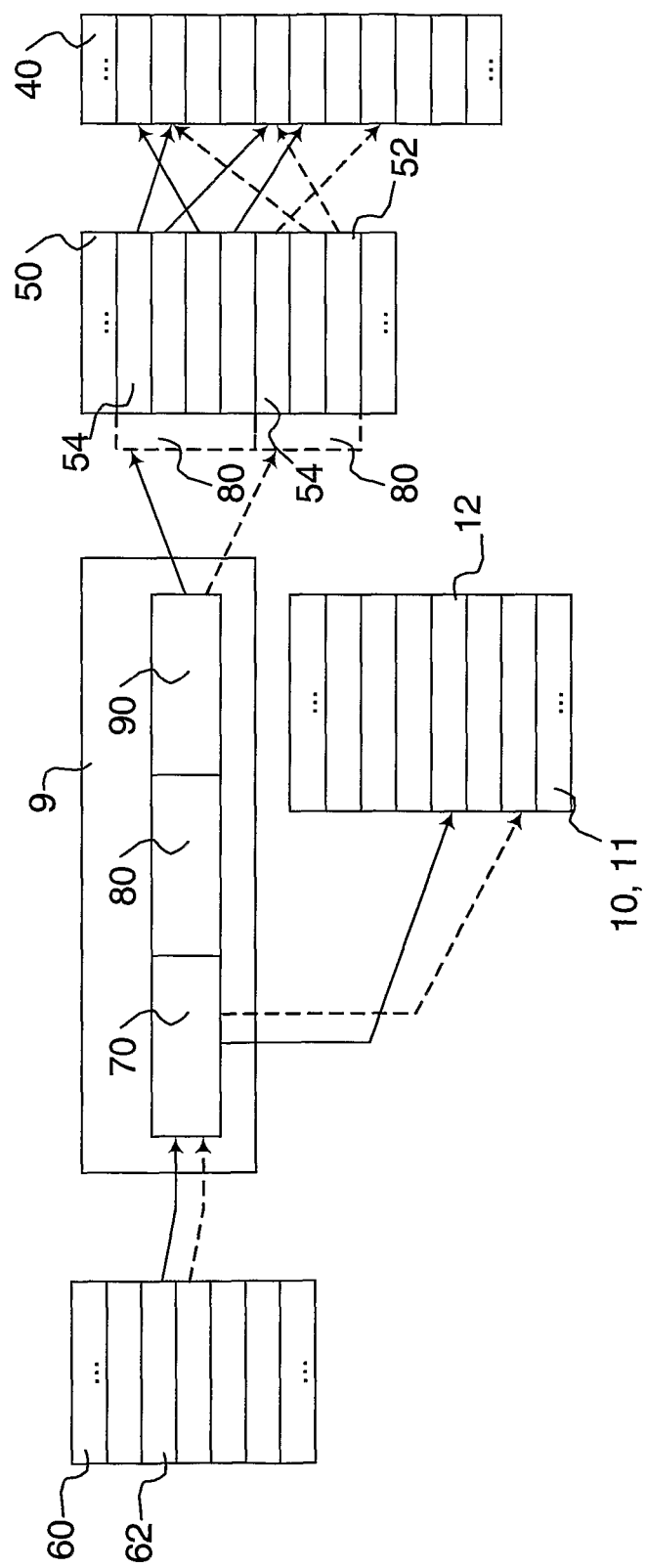
FIG. 4 presents a block diagram of an example of a byte code execution according to an embodiment of the invention.

FIG. 4 shows one example of a Byte Code Executor 9 according to an embodiment of the invention. In the embodiment the Byte Code Executor 9 fetches one instruction 62 at a time. A single instruction 62 contains three parts: function pointer 70, number of parameters 80 and pointer-to-parameters 90 of the instruction 62.

FIG. 4 describes how a single instruction 62 is handled in the Byte Code Executor 9. Each instruction 62 includes the following parts:

Function pointer 70—Function pointer 70 points to the actual function code 12 that is used in the execution of this instruction 62.

Number of parameters 80—Function can use different number of parameters 52 depending on the use of the function. E.g. value match function may get 3-N parameters depending on the number of values for matches.

Pointer to parameters 90—Pointer to parameters 90 points to the parameter array 50, which contains all parameters 52 needed in entire predefined processing logic. All parameters 52 of this instruction 62 are in the array 50 one after another. The pointer 90 refers to the first parameter 54 and the number of parameters 80 tells how many of them should be used. Parameter list can contain both input and output parameters.

In the embodiment, function gets both number of parameters 80 and the pointer to parameter list 90 as function arguments.

In the embodiment, Byte Code Executor 6 handles the execution of the byte code 5. The execution is performed blindly, without regard for the functions that are executed. The byte code 5 is divided in three different parts: initialisation, processing and shutdown parts. Byte code execution is a straightforward task:

1. Fetch next instruction from instruction list (the one that program counter refers to).

2. Call the function of the instruction using parameter count and parameter pointer as function parameters.

3. Check if the execution has reached the end of the instruction list.

a. If not, increase the program counter by one and jump to part 1.

b. If the execution has reached the end, return from process function and give the control back to the node base.

Processing Logic Executor of the above-described embodiment is a very flexible component. A user can program new custom functions into the system without modifying the existing implementation. This makes it possible to create even very complicated logic using Processing Logic and make customer specific modifications to the system if needed without affecting the performance.

Processing Logic Executor of the above-described embodiment also provides high performance. Interpretation overhead is minimal in this implementation meaning that running logic with Processing Logic Executor is almost like running a native code program specifically programmed for the customer's logic.

Processing Logic Executor of the above-described embodiment is also very modular and thus easy to test. Each function is an independent software component that can be tested with an automated tool. This will save costs in porting of the product and makes it easier to implement new functionality to the system.

In the embodiment of the invention, Processing Logic byte code 5 is stored in plain text format to avoid problems with porting from one platform to another. Byte code 5 contains following components:

Header—Header contains detailed information about the predefined processing logic.

Fields—This section contains instructions for creating the field array. It lists all fields, their lengths and initial values.

Instructions—This section lists the instructions and their parameters.

In the embodiment of the invention, byte code parser 8 takes care of reading the byte code file 5, parsing it to internal structures and pre-formatting fields. Internal structures include following components:

Data field arrays 40—Fields are stored into two arrays: one containing all integers and another containing all strings. Fields are read and initialised. Initialisation contains memory allocation and setting value, if needed.

Instruction array 60—Instructions are stored into one long array. They are stored there as described in Processing Logic Byte Code Executor design.

In the embodiment of the invention, Processing Logic functions 10, 11 are tested with an automated test tool. The function developer may create some test data into a text file in a defined format and execute the test cases.

The automated test tool uses Processing Logic function library 7 for loading the functions 10, 11 defined in test case file. No coding is needed for tests.

An embodiment of the invention includes processing data records in mediation systems with communications networks. Sophisticated mediation solutions have several beneficial features, the most important of which are explained below.

Figure 5:
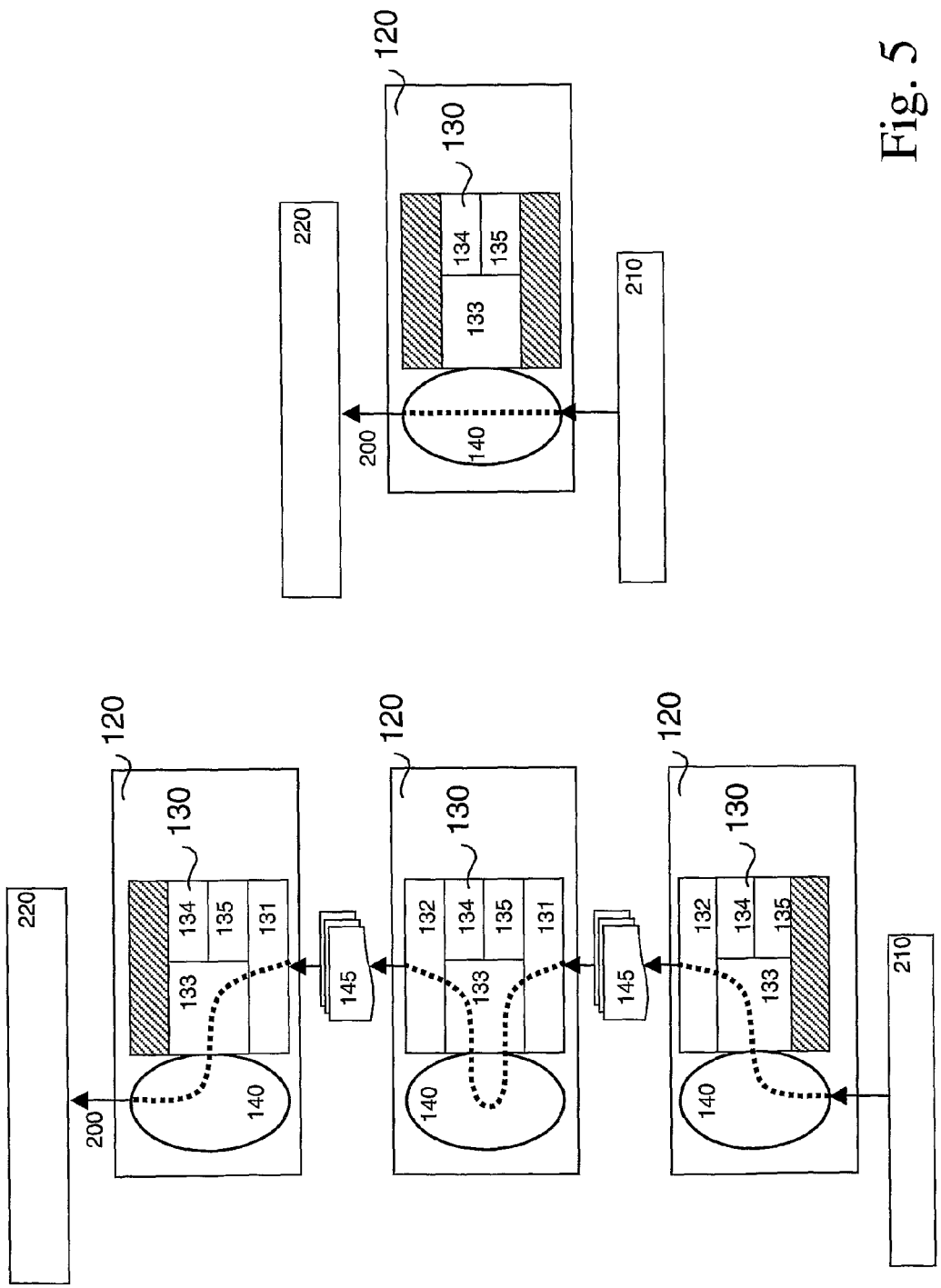
FIG. 5 presents a flow diagram of an example of mediation process according to an embodiment of the invention.

In FIG. 5, each node 120 includes a node base 130 and a node application 140. Node base 130 provides the basic standard functionality for the node 120. It handles the internal usage data transmission mechanism between the nodes 120 and encodes the internal usage data. Node base 130 provides an interface to the node application 140 for accessing the usage data and collecting customised audit information. For performing its tasks the node base 130 may include several components, for example a node input 131, a node output 132, a node API 133, a node configuration 134 and a node audit 135.

Node Input 131 is responsible for reading the data, input records 20, from the internal input data sources, parsing it and passing the data to Node Application interface. Node Input 131 uses a Data Transmission Interface 145 that defines the internal data format and data transmission mechanism.

Node Output 132 is responsible for reading the data, output records 30, from the Node Application Interface and encoding and writing it to Data Transmission Interface 145. Node Output uses Data Transmission Interface 145 that defines the internal data format and data transmission mechanism.

Node API 133 provides the Node Application 140 the access to the usage data. It 'hides' to internal data transmission interface from the Node Application 140. Node API 133 includes functionality for providing the usage data to and receiving it from the Node Application 140. It is also used for retrieving customised audit information from the Node Application 140 and for providing configuration parameters to it.

Node Configuration 134 is responsible for reading the configuration data from a Configuration Interface and for initialising the Node according to given configuration parameters. Node Configuration 134 also passes Node Application specific parameters to the Node API. Node Configuration uses Configuration Interface that defines the configuration data format and transmission mechanism.

Node Audit 135 is responsible for writing various audit data to an Audit Interface. Node Audit 135 defines content for audit interface. Node Audit 135 uses Audit Interface that defines the default audit data format and transmission mechanism. Node Audit 135 uses also a Management Interface that defines monitored data format and transmission mechanism. This is used for example for indicating the status of the Node.

Data Transmission Interface and/or buffering 145 define the usage data format and data transmission mechanism between the Nodes.

Mediation consists of different processes like collection, validation, enrichment, aggregation, correlation, rating, conversion and delivery. The varied functionality allows OSS/BSS systems to receive usage data just as they want it.

The keywords of the mediation solution architecture are simple and straightforward. The modular design of the solution according to an embodiment of the invention enables real-time and distributable processes, reliable operation and high performance.

Node (Mediation Process)

Nodes 120 are functional components specialised in different mediation processes, such as collection, aggregation, validation, correlation and formatting, or a combination of these. Nodes 120 are linked together to form processing streams for event record handling.

Each Node 120 has standard functionality that provides an automated data transmission mechanism between the Nodes 120 and processing information logging mechanism between the Node and the Node Manager (not shown in figure). The actual usage data processing logic is implemented by different applications 140 that reside in the Nodes. These applications 140 are isolated from internal data transmission mechanism and internal data formats enabling easier application development. Applications 140 are drawn as ovals in the FIG. 5 presented. The system provides a standard interface through which the applications communicate with the processing framework.

Nodes 120 can be further categorised according to their functionality. The functionality depends on the Node Application 140 and the Node's position in the Processing Chain 200. The first Node 120 in a Processing Chain can be called a Collector Node and the last Node a Distribution Node. In these cases the data parsing and formatting functionality needs to be performed by the application 140 itself and the standard functionality provided by the Node Base 130 is not used. The flow of usage data and the standard components that become obsolete are shown in the FIG. 5. In this Fig., it is assumed that the data source 210 and destination 220 both operate with some real-time protocol, i.e. they are using a socket connection for sending and receiving data.

If the output data destination 220 requires the use of file-based interface, the applications take care of formatting and writing the data in the output files. In a case like this, it might be necessary to separate the output file generation and the delivery of the output files to separate Nodes 120.

In an embodiment of the presented invention the Processing Logic Executor 6 represents an example of a node application 140 used in mediation systems.

The above description is only to exemplify the invention and is not intended to limit the scope of protection offered by the claims. The claims are also intended to cover the equivalents thereof and not to be construed literally.

The invention claimed is:

1. A system for processing data records according to a predefined logic, the system comprising:
    a data field array containing fields for storing data under processing in the system;
    a logic definition structure containing the predefined logic, the logic definition structure comprising,
    a parameter array containing pointers to data fields for storing values of the parameters needed in the predefined logic,
    a function code set containing program codes for performing functions needed in the predefined logic, and
    a series of byte code instructions, wherein each byte code instruction contains:
    a function pointer pointing to a function code in the function code set to be used in the execution of the instruction, and
    a pointer-to-parameters that points to a set of parameter pointers in the parameter array that are needed in the execution of the instruction;
    and
    a logic execution means for executing the predefined logic contained in the logic definition structure, wherein the logic execution means comprises a program counter pointing to a byte code instruction in the series of byte code instructions, and means for resetting the program counter such that the program counter points to the first byte code instruction when the logic execution means starts to process a new data record, and means for setting the program counter to point to the following byte code instruction after each function call.

2. The system according to claim 1, configured to receive input data records having a specified form with data fields and values in said data fields.

3. The system according to claim 1, configured to produce output data records having a specified form with data fields and values in said data fields.

4. The system according to claim 1, wherein the data field array contains the data fields for storing values of the parameters needed in the predefined logic, fields for storing values read from a data record under processing, and fields for writing output of the functions.

5. The system according to claim 4, wherein the pointers to data fields in the parameter array are direct pointers to the memory locations of the fields in the data field array.

6. The system according to claim 1, wherein while the system is in operation and processing a data record, the values stored in the data field array contain:
    values for the parameters of the predefined logic, and
    values from the data record under processing,
    and when the processing is complete, the values stored in the data field array also contains:
    values for the output of the process, and
    at least some intermediate values, if the intermediate values were needed in processing the data record.

7. The system according to claim 1, wherein each pointer in the parameter array points to a single data field in the data field array.

8. The system according to claim 1, wherein the system contains at least two different pointers pointing to a one common data field in the data field array.

9. The system according to claim 1, wherein the function code set contains a function having a number of parameters and another function having a different number of parameters.

10. The system according to claim 1, wherein the function code set is dynamically extensible.

11. The system according to claim 1, wherein the program codes in the function code set are in the form of binary code directly executable by an operating system.

12. The system according to claim 1, wherein the construction of the parameter array is such that each set of parameters needed in the execution of the byte code instructions is formed by consecutive parameters in the parameter array.

13. The system according to claim 12, wherein the pointer-to-parameters contains a pointer to the first parameter and a number of the parameters needed in the execution of the byte code instruction.

14. The system according to claim 1, wherein the function pointer and the pointer-to-parameters are direct pointers pointing memory locations.

15. The system of claim 1, wherein at least one function code in the function code set comprises program code means for changing the value of the program counter.

16. A mediation system for handling event records in a communications network between a generation layer of events and an operation system layer of events, the system comprising:
 at least one node comprising;
  a data field array containing fields for storing data under processing in the system;
  a logic definition structure containing the predefined logic, the logic definition structure comprising,
   a parameter array containing pointers to data fields for storing values of the parameters needed in the predefined logic,
   a function code set containing program codes for performing functions needed in the predefined logic, and
   a series of byte code instructions, wherein each byte code instruction contains:
   a function pointer pointing to a function code in the function code set to be used in the execution of the instruction, and
   a pointer-to-parameters that points to a set of parameter pointers in the parameter array that are needed in the execution of the instruction;
  and
 a logic execution means for executing the predefined logic contained in the logic definition structure;
 wherein the at least one node includes:
  a node base program means capable of providing basic software functionality for the node, said basic software functionality including an external interface of the node and an internal interface of the node,
  an application programming interface means for receiving application programs for the node, which application programs are capable of interfacing with the internal interface of the node, and
  an application program,
 and wherein the logic definition structure is contained in the application program of the node.

17. A method of processing data records having a plurality of data fields and values in at least some of said data fields, the method comprising:
 reading values from at least some of the data fields of a data record,
 writing the read values in fields of a data field array,
 processing the values from the data record in the fields of the data field array by executing a sequence of instructions, wherein each instruction in the executed sequence is in a byte code form and contains a function pointer pointing to a function code in a function code array and a pointer-to-parameters that points to a set of parameter-value-pointers in a parameter array, said processing including executing each of the pointed function codes using the values pointed by the pointed set of parameter-value-pointers;
 receiving a processing logic from a graphical user interface; and
 forming the sequence of instructions on the basis of the received processing logic, comprising:
  compiling the received processing logic to produce a series of byte code instructions and the parameters for said instructions, and
  parsing the series of byte code instructions to form the sequence of instructions, wherein the instructions are in the form of the function pointers and the pointers to parameters.

18. The method of claim 17, wherein instructions in the executed sequence of instructions are stored in an instruction array.

19. The method of claim 18, wherein the executed sequence of instructions contains at least one subsequence of instructions, and the instructions in the at least one subsequence of instructions are located consecutively in the instruction array.

20. The method of claim 18, wherein the step of processing data comprises for each instruction in the sequence of instructions:
 reading a program counter pointing to an instruction in the instruction array,
 fetching the instruction pointed by the program counter,
 calling the pointed function and giving the pointer-to-parameters as an argument, and
 incrementing the program counter.

21. The method according to claim 17, comprising producing at least one output data record after executing the sequence of instructions, wherein the at least one output data record includes a plurality of data fields and the step of producing the at least one output data record comprises:
 reading values in at least some of the fields in the data field array, and
 writing the values read from the data field array in the data fields of the at least one output data record.

22. The method according to claim 17, wherein the function pointer and the pointer-to-parameters are in the form of direct pointers pointing to memory locations.

23. The method according to claim 17, wherein each of the parameter-value-pointers points to a single field in the data field array and is in the form of a direct pointer pointing to a memory location.

24. The method according to claim 17, wherein the values under processing are stored in the data field array, said values including the values of the parameters needed in the predefined logic, the values read from the data record under processing, and the output of the functions.

25. The method according to claim 17, wherein a same parameter value is used in a more than one function.

26. The method according to claim 17, wherein the function codes in the function code set are in the form of binary code directly executable by an operating system.

27. The method according to claim 17, wherein said data records are event records in a mediation system of a communications network.

28. The method according to claim 17, wherein after processing a data record the method, comprises repeating the method with another data record.

29. The method of claim 28, wherein the values from a subsequent data record are written in the same data field array to substitute for the values from a preceding data record.

30. A system for processing data records according to a predefined logic, the system comprising:
 a data field array containing fields for storing data under processing in the system;
 a logic definition structure containing the predefined logic, the logic definition structure comprising, a parameter array containing pointers to data fields for storing values of the parameters needed in the predefined logic, a function code set containing program codes for performing functions needed in the predefined logic, and a series of byte code instructions, wherein each byte code instruction contains:

a function pointer pointing to a function code in the function code set to be used in the execution of the instruction, and a pointer-to-parameters that points to a set of parameter pointers in the parameter array that are needed in the execution of the instruction;

a logic execution means for executing the predefined logic contained in the logic definition structure;

a graphical user interface for defining the predefined logic, a compiler for compiling the predefined logic to produce the series of byte code instructions and the parameters for said instructions, and a byte code parser for parsing the series of byte code instructions to form the logic definition structure comprising the instructions in the form of the function pointers and the pointers to parameters.

31. The system according to claim 30, configured to receive input data records having a specified form with data fields and values in said data fields.

32. The system according to claim 30, configured to produce output data records having a specified form with data fields and values in said data fields.

33. The system according to claim 30, wherein the data field array contains the data fields for storing values of the parameters needed in the predefined logic, fields for storing values read from a data record under processing, and fields for writing output of the functions.

34. The system according to claim 33, wherein the pointers to data fields in the parameter array are direct pointers to the memory locations of the fields in the data field array.

35. The system according to claim 30, wherein while the system is in operation and processing a data record, the values stored in the data field array contain:

values for the parameters of the predefined logic, and values from the data record under processing, and when the processing is complete, the values stored in the data field array also contains:

values for the output of the process, and at least some intermediate values, if the intermediate values were needed in processing the data record.

36. The system according to claim 30, wherein each pointer in the parameter array points to a single data field in the data field array.

37. The system according to claim 30, wherein the system contains at least two different pointers pointing to a one common data field in the data field array.

38. The system according to claim 30, wherein the function code set contains a function having a number of parameters and another function having a different number of parameters.

39. The system according to claim 30, wherein the function code set is dynamically extensible.

40. The system according to claim 30, wherein the program codes in the function code set are in the form of binary code directly executable by an operating system.

41. The system according to claim 30, wherein the construction of the parameter array is such that each set of parameters needed in the execution of the byte code instructions is formed by consecutive parameters in the parameter array.

42. The system according to claim 41, wherein the pointer-to-parameters contains a pointer to the first parameter and a number of the parameters needed in the execution of the byte code instruction.

43. The system according to claim 30, wherein the function pointer and the pointer-to-parameters are direct pointers pointing memory locations.

44. The system according to claim 30, comprising functionality for adding a custom function in the function code set, and for effecting said functionality, wherein the functionality comprises:

means for displaying a screen in the graphical user interface for defining the parameters of the custom function, and a custom function extension in the compiler for modifying the logic definition structure to include the custom function and parameters of the custom function.

45. A method for processing data records according to a predefined logic including a data field array containing fields for storing data under processing in the system, a logic definition structure containing the predefined logic, the logic definition structure including a parameter array containing pointers to data fields for storing values of the parameters needed in the predefined logic, a function code set containing program codes for performing functions needed in the predefined logic, and a series of byte code instructions, wherein each byte code instruction contains a function pointer pointing to a function code in the function code set to be used in the execution of the instruction, and a pointer-to-parameters that points to a set of parameter pointers in the parameter array that are needed in the execution of the instruction, and a logic execution means for executing the predefined logic contained in the logic definition structure, the method comprising:

pointing, with a program counter, to a byte code instruction in the series of byte code instructions;

resetting the program counter such that the program counter points to the first byte code instruction when the logic execution means starts to process a new data record; and setting the program counter to point to the following byte code instruction after each function call.

46. A method for processing data records according to a predefined logic including a data field array containing fields for storing data under processing in the system, a logic definition structure containing the predefined logic, the logic definition structure including a parameter array containing pointers to data fields for storing values of the parameters needed in the predefined logic, a function code set containing program codes for performing functions needed in the predefined logic, and a series of byte code instructions, wherein each byte code instruction contains a function pointer pointing to a function code in the function code set to be used in the execution of the instruction, and a pointer-to-parameters that points to a set of parameter pointers in the parameter array that are needed in the execution of the instruction, a logic execution means for executing the predefined logic contained in the logic definition structure, a graphical user interface, a compiler, and a byte code parser, the method comprising:

defining the predefined logic with the graphical user interface;

compiling the predefined logic with the compiler to produce the series of byte code instructions and the parameters for said instructions; and parsing the series of byte code instructions with the byte code parser to form the logic definition structure comprising the instructions in the form of the function pointers and the pointers to parameters.

47. A computer readable medium having stored instructions for processing data records according to a predefined logic including a data field array containing fields for storing data under processing in the system, a logic definition structure containing the predefined logic, the logic definition structure including a parameter array containing pointers to data fields for storing values of the parameters needed in the predefined logic, a function code set containing program codes for performing functions needed in the predefined logic, and a series of byte code instructions, wherein each byte code instruction contains a function pointer pointing to a function code in the function code set to be used in the execution of the instruction, and a pointer-to-parameters that points to a set of parameter pointers in the parameter array that are needed in the execution of the instruction, and a logic execution means for executing the predefined logic contained in the logic definition structure, the instructions comprising:

instructions for pointing, with a program counter, to a byte code instruction in the series of byte code instructions;

instructions for resetting the program counter such that the program counter points to the first byte code instruction when the logic execution means starts to process a new data record; and instructions for setting the program counter to point to the following byte code instruction after each function call.

48. A computer readable medium having stored instructions for processing data records according to a predefined logic including a data field array containing fields for storing data under processing in the system, a logic definition structure containing the predefined logic, the logic definition structure including a parameter array containing pointers to data fields for storing values of the parameters needed in the predefined logic, a function code set containing program codes for performing functions needed in the predefined logic, and a series of byte code instructions, wherein each byte code instruction contains a function pointer pointing to a function code in the function code set to be used in the execution of the instruction, and a pointer-to-parameters that points to a set of parameter pointers in the parameter array that are needed in the execution of the instruction, a logic execution means for executing the predefined logic contained in the logic definition structure, a graphical user interface, a compiler, and a byte code parser, the instructions comprising:

instructions for defining the predefined logic with the graphical user interface;

instructions for compiling the predefined logic with the compiler to produce the series of byte code instructions and the parameters for said instructions; and instructions for parsing the series of byte code instructions with the byte code parser to form the logic definition structure comprising the instructions in the form of the function pointers and the pointers to parameters.

\* \* \* \* \*